March 9, 1965 P. ISAAC 3,172,684
SAFETY BELT APPARATUS FOR VEHICLES
Filed Nov. 15, 1962 4 Sheets-Sheet 1

INVENTOR
PETER ISAAC
BY~ Fetherstonhaugh & Co.
ATTORNEYS

March 9, 1965  P. ISAAC  3,172,684
SAFETY BELT APPARATUS FOR VEHICLES
Filed Nov. 15, 1962  4 Sheets-Sheet 2

INVENTOR
PETER ISAAC
BY- Fetherstonhaugh & Co.
ATTORNEYS

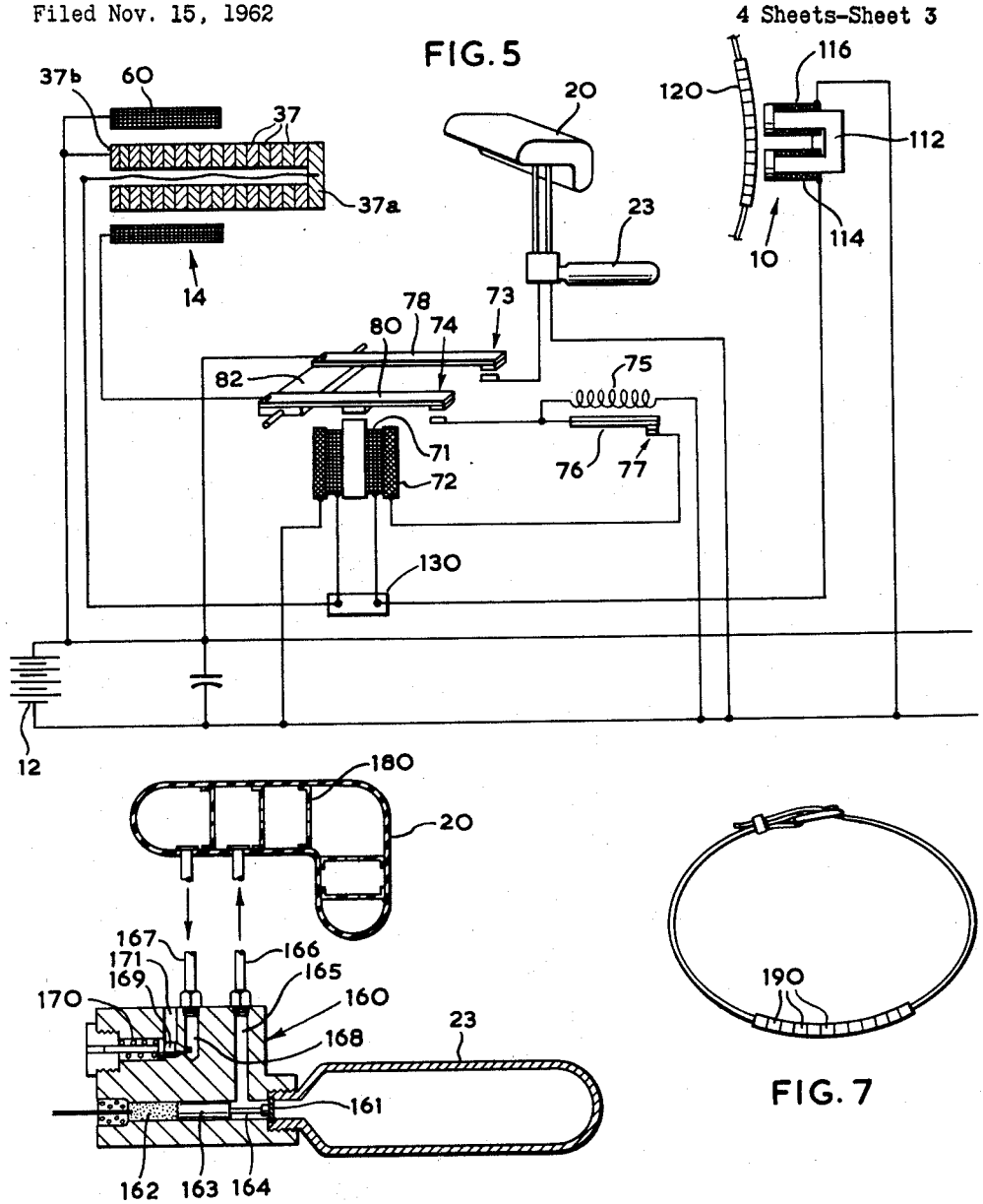

March 9, 1965 P. ISAAC 3,172,684
SAFETY BELT APPARATUS FOR VEHICLES
Filed Nov. 15, 1962 4 Sheets-Sheet 4

INVENTOR
PETER ISAAC
BY: Featherstonhaugh & Co
ATTORNEYS

United States Patent Office 3,172,684
Patented Mar. 9, 1965

3,172,684
SAFETY BELT APPARATUS FOR VEHICLES
Peter Isaac, 9 Crown Hill, Apt. 410, Toronto 18,
Ontario, Canada
Filed Nov. 15, 1962, Ser. No. 238,329
20 Claims. (Cl. 280—150)

This invention relates to safety devices for vehicles and is more particularly concerned with an improved safety belt assembly and an improved inflatable crash pad system.

This application is a continuation-in-part of application Serial No. 190,501, filed April 26, 1962 and now abandoned.

The safety devices which constitute the present invention have been particularly devised for use in automobiles and trucks, but it will be understood that their use need not be so restricted since they are readily adaptable to any type of vehicle.

The most common type of safety device now available for automobiles and trucks consists of a simple safety belt which is fixed to the vehicle seat and adapted to be tightened over the lap of the passenger so as to restrain the passenger against undue movement in the event of rapid deceleration of the vehicle. These devices which are commonly known as "seat belts" have been used in airplanes for many years. They are now coming into more common use in automobiles, and those people responsible for reducing the seriousness of automobile accidents are hopeful they will come into widespread use. Unfortunately, the known type of seat belts have several disadvantages and drivers adopt them only with reluctance. It is found that people who install seat belts in their automobile will often neglect to use them at all times, due to the bother of attaching them about themselves, as well as the inconvenience of being restrained from normal movement on the seat. Further, it is found that drivers planning to make a short trip will avoid the process of doing up their safety belts on the grounds that they plan to be in the automobile for a short time only. Thus, it is found that people are both reluctant to install safety belts in the first place and in the second place, they are reluctant to use them even when they are installed. Another drawback of the present type of seat belt is that whereas it is common to install two sets of seat belts on the standard automobile seat, it is quite often the case that three people will occupy that same seat whereby one of the three must do without a safety belt.

Another type of safety device which is now available to a limited extent is the provision of crash pads on the dashboards of vehicles. Unfortunately, if a crash pad is to be effective, it must be rather bulky and automobile manufacturers are reluctant to interfere with the overall appearance of the vehicles by providing such bulky devices. It is an object of the present invention to satisfy both the requirement for bulky crash pads and the requirement of the manufacturer that the crash pad be inconspicuous when not needed.

The other chief object of this invention is to provide seat belts which accomplish all the aims and purposes of the known types of safety belts without inconveniencing the occupants of the vehicle in any way, and providing the safety features only when actually required, during an accident or a rapid deceleration of the vehicle.

The invention will be more thoroughly understood from the following description of a preferred embodiment thereof as read with the reference to the accompanying drawings.

In the drawings,

FIGURE 5 is a schematic circuit diagram of the safety devices illustrated in FIGURE 1.

FIGURE 6 is a transverse sectional view of one of the inflatable crash pad devices shown in FIGURE 1 and the equipment used to effect inflation of same, and FIGURE 7 is a pictorial view of a magnetic safety belt in accord with the invention.

Figure 1:
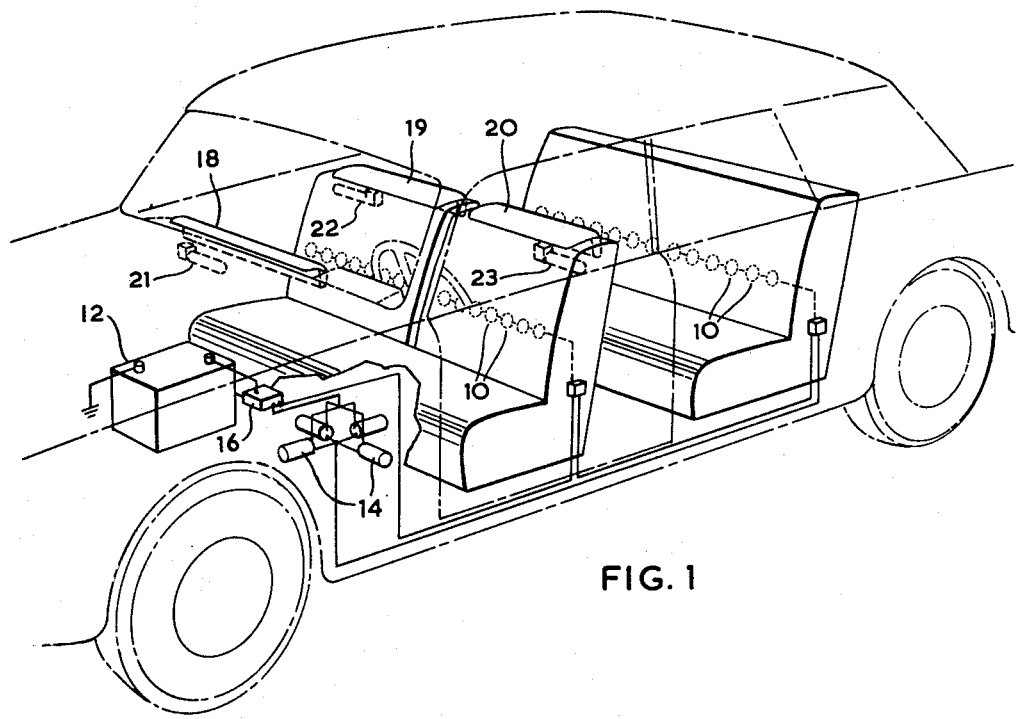
FIGURE 1 is a perspective view of a vehicle equipped with the safety devices in accord with the present invention, the representation of these devices being somewhat schematic for illustrative purposes.

Referring to FIGURE 1, the vehicle illustrated is a common automobile, illustrated only in sufficient detail to demonstrate the manner in which the present invention is used. Incorporated in the back rests of the seats are a plurality of electromagnets 10 which are preferably located at the approximate height of a person's waist. It is the intent of this invention that these electromagnets will be activated only when the automobile is subjected to deceleration. The current required to activate electromagnets 10 is supplied by the standard battery 12, as it is not necessary to install a separate battery for the operation of the safety devices in accord with the invention. The flow of current to the electromagnets 10 is controlled by one or more decelerometers 14 and relay 16. In the illustrated form of the invention, four decelerometers 14 are provided but in the simplest form of the invention, only one is required. This single decelerometer would be one which detects retardation of the forward advance of the vehicle since it is such deceleration which normally is encountered. In the preferred form of the invention, four decelerometers are provided so as to detect retardation of rearward movement as well as retardation of movement to either side. Thus, in the unlikely event that the automobile should be travelling backward at a high rate of speed and have its progress quickly retarded, electromagnets 10 would be activated. Similarly, should the automobile be advancing in a sideways direction, such as might occur should an automobile skid on wet pavement, the other decelerometers will detect retardation of this motion and effect activation of electromagnets 10.

One of the objects of this invention is achieved by providing each passenger in the automobile with a magnetic belt which is magnetically attracted by the electromagnets under conditions of deceleration as described above, so as to hold the passengers in their seats. However, the chief advantage of this arrangement over the common type of seat belt arrangement now used is that the passengers are not held tightly in their seats under normal driving conditions. Thus, they are restrained only at times of emergency and at all other times they are free to move on the seats.

As will be explained in detail hereinafter, decelerometers 14 also trigger the mechanisms responsible for inflating the crash pads 18, 19 and 20. The latter devices are mounted, respectively, on the dash board of the vehicle and on the tops of the front seat back rests. Accordingly, it is their main purpose to protect the front seat passengers and the rear seat passengers rather than the driver. Crash pads 18, 19 and 20 are inflated by compressed gas stored in cylinders 21, 22 and 23. The gas passes from the cylinders to the crash pads as sealing diaphragms are pierced by electrically fired piercing pins which are set off by the decelerometers 14 and relay 16. As will be understood from the above, the two main objects of the invention, i.e., the actuation of electromagnets 10 and the inflation of crash pads 18, 19 and 20 are both effected by the decelerometers 14 and related mechanisms.

Figure 2:
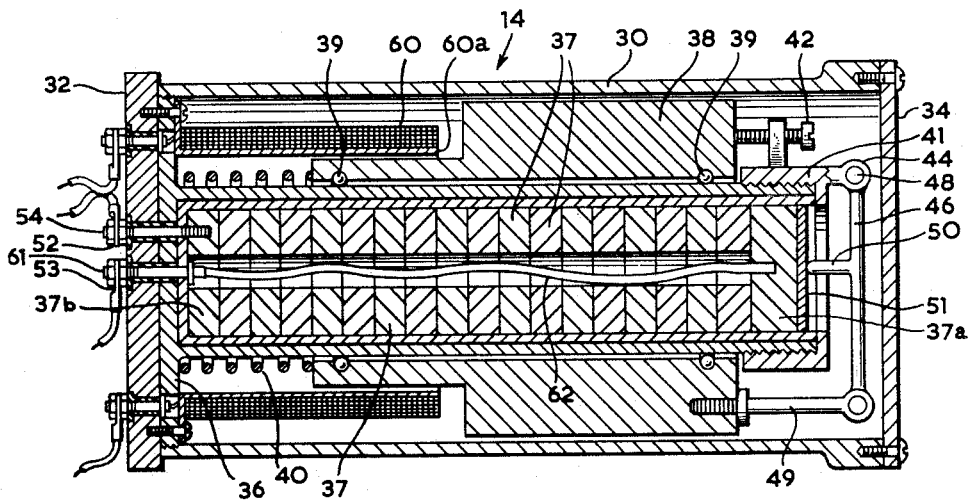
FIGURE 2 is a longitudinal sectional view of an inertia rheostat device in accord with this invention which forms part of the total system illustrated in FIGURE 1.

To understand the operation of decelerometers 14, reference should be had to FIGURE 2 of the drawings. Decelerometers 14 essentially consist of variable resistors placed in series in the electrical circuit including battery 12, relay 16, electromagnets 10 and the mechanisms for effecting firing of the explosive type pins which puncture the sealing diaphragms of the gas cylinders used when inflating the crash pads.

The decelerometers illustrated in FIGURE 2 include an appropriate casing 30 having end plates 32 and 34. Casing 30 preferably is cylindrical in shape but not necessarily so. It carries a concentric housing member 36 within which is carried a number of carbon discs 37. The latter are arranged in face to face abutting fashion and they each have a hole in their center so as to provide a longitudinal passageway through all of the discs. A weight 38 is coaxially mounted on housing 36 and is capable of free reciprocating motion, aided by the ball-bearings 39. A coil spring 40 biases weight 38 to the right, as seen in FIGURE 2. An end cap 41 is threaded onto the end of housing 36. It carries an adjustable screw 42 which is used to provide an adjustable stop member to determine the right hand limit to the movement of weight 38. End cap 41 also carries a pair of ears 44 between which is pivotally mounted one end of a lever 46, the latter being free to pivot about a pin or bolt 48 extending through this end of lever 46 and ears 44. The other end of lever 46 is pivotally fixed to a similar eared member 49 which is threaded in an aperture in weight 38. Thus, as weight 38 reciprocates back and forth, lever 46 is caused to pivot about pin 48. Lever 46 carries an integral pin 50 which projects through an aperture in the end cap 41 to engagement with a plate 51. The latter lies against the first carbon disc 37a and it can readily be seen that as weight 38 reciprocates back and forth, the action of lever 46, pin 50 and plate 41 compresses and decompresses the carbon discs 37. As is well known, such an arrangement of carbon discs acts as a variable resistance or rheostat and by arranging discs 37 in series between battery 12 and electromagnets 10 they act as a rheostat for varying the supply of current to electromagnets 10 in response to changes in deceleration of the vehicle as detected by weight 38. To provide for this connection, a pair of terminal connectors 52 and 53 are connected to the carbon discs at the two opposite ends of the series. Thus, it will be seen that terminal connector 52 is connected to the left hand end disc 37b by the pin member 54 and terminal connector 53 is connected to the right hand end disc 37a by the pin 61 and the insulated wire 62. It will be appreciated, of course, that terminal connectors 52 and 53, are, in turn, connected in series between battery 12 and electromagnets 10 as will be explained hereinafter. It will be further appreciated that the value of the resistance provided by discs 37 can be adjusted by means of the adjustable stop 42 as well as by the selection of spring 40.

It will be noted that the lefthand end of weight 38, as viewed in FIGURE 2, is considerably reduced in diameter. About this portion of weight 38, there is wound a solenoid coil 60. More correctly, coil 60 is wound about an insulating cylindrical core 60a. By forming weight 38 of a magnetic material, the left-hand end part of weight 38 acts as a solenoid plug which is pulled forcibly to the left as coil 60 is activated. The latter is accomplished by the activation of a relay as is explained hereinafter. It can be stated at this point, however, that, in effect, coil 60 acts to reduce the resistance of discs 37 to an absolute minimum, by pulling weight 38 as far to the left as possible. This reduction in resistance then allows the maximum amount of current to flow to electromagnets 10 so as to grip or attract the magnetic belt worn by the driver and his passengers as strongly as possible in the event of strong deceleration of the vehicle.

Figure 3:
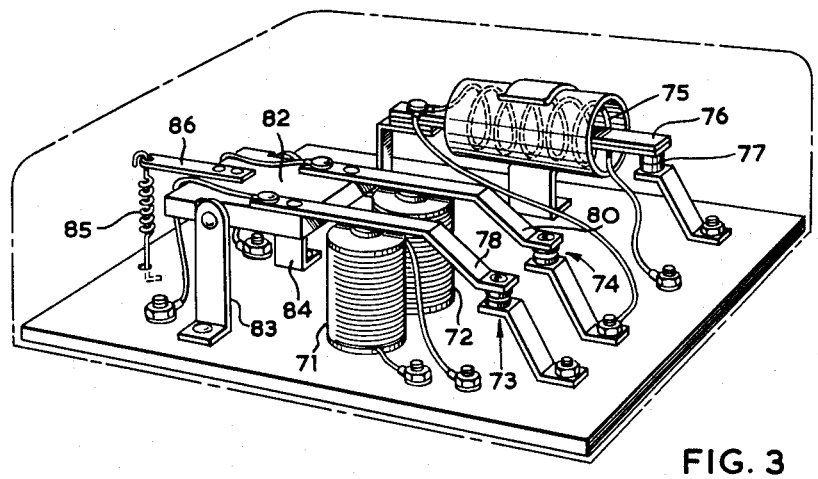
FIGURE 3 is a perspective view of a relay device forming part of the total equipment illustrated in FIGURE 1.

FIGURE 3 illustrates the details of construction of the relay 16. This device essentially consists of a pair of side by side coils 71 and 72, associated points 73 and 74, and a delay switch consisting of a heating coil 75, bimetallic strip 76 and points 77. It will be noted that the armatures 78 and 80 associated with the coils 71 and 72 are each fixed to a mounting block 82 which is pivotally mounted between a pair of upstanding bracket members 83 and 84. A spring 85 connected with an arm member 86 which is, in turn, connected to block 82 normally biases armatures 78 and 80 away from coils 71 and 72 whereby to maintain points 73 and 74 in the open position.

As will be explained later with reference to the circuit diagram FIGURE 5, a shunt is provided in the circuit connecting the decelerometer 14 with electromagnets 10 to divert a small fraction of the current flowing in this circuit to the coil 71 of relay 16. When this small current exceeds a predetermined value as the result of a very rapid deceleration of the vehicle, armatures 78 and 80 are pulled down against the tension of spring 85 by the attraction of the coil 71 on armature 78. As a result, points 73 and 74 are closed giving rise to several effects. Firstly, as will be readily apparent from the circuit diagram of FIGURE 5, the coil 72 is activated so as to hold armatures 78 and 80 down and secondly, coil 60 of decelerometer 14 is activated so as to assist the deceleration forces in pulling weight 38 to the left as seen in FIGURE 2. Several subsidiary effects also take place. The closing of points 73 causes current to flow to the explosive charge of the piercing pin in the inflatable crash pad inflating mechanisms whereby to cause gas to escape from the cylinders into the crash pads. This process will be explained hereinafter. The closing of points 74 causes current to flow through heating coil 75. After a predetermined time interval, the bimetallic strip 76 is heated to a certain temperature which causes it to bend sufficiently to break open points 77 and cut off current to the holddown coil 72. If at this moment, the current flowing through coil 71 is low, i.e., the strong deceleration of the vehicle has stopped, neither coil 71 nor 72 is activated and points 73 and 74 are broken shutting off the current to the solenoid coil 60 thereby allowing weight 38 to shift to the right to the normal position prior to the start of the deceleration.

Figure 4:
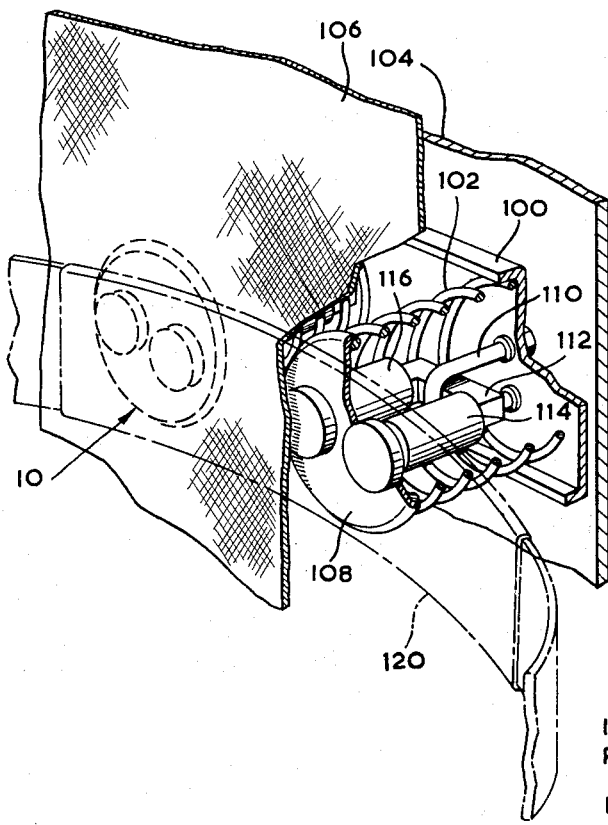
FIGURE 4 is a cut-away perspective view of a portion of one of the seat back rests illustrated in FIGURE 1 and showing the incorporation of a plurality of electromagnets therein.

Referring now to FIGURE 4, the illustrated preferred method of mounting electromagnets 10 in the back rests of the seats of the vehicle will now be described. The automobile seat back rest illustrated in FIGURE 4 is one of the common types of back rests now in widespread use and essentially consists of transverse frame members 100, a plurality of internal springs 102 and back and front outer coverings 104 and 106. The preferred method of mounting a U-shaped electromagnet within this back rest construction is to place it within the coil 102 and to provide a locating disc 108 at the front end of the spring and a U-shaped bracket 110 connecting the electromagnet to the frame member 100. The illustrated electromagnet consists of a U-shaped core 112 and a pair of series connected windings 114 and 116 wrapped about the arms of the core 112. By the mounting arrangement just described, force exerted on the electromagnet is transferred to the member 100 and eventually to the frame of the vehicle itself. The member 120 indicated in dot and dash lines is a magnetic belt which may be of the type illustrated in FIGURE 7. The belt is worn about the waist of the driver or one of the passengers as the case may be. It will be realized, of course, that a shoulder harness arrangement may be used in lieu of a waist belt depending upon the particular manner in which it is desired to restrain the person in the vehicle seat.

FIGURE 5 is a somewhat pictorial circuit diagram showing, inter alia, the manner in which the carbon discs 37, 37a and 37b are placed in the circuit connecting the battery 12 with electromagnets 10. As the resistance of the carbon disc rheostat is varied by the shifting of the weight 38, so varies the current supplied to electromagnets 10. As previously explained, when the vehicle undergoes a fast deceleration, the inertia of weight 38 assisted by the action of the coil 60 reduces the resistance of carbon discs 17 to a minimum thereby supplying a maximum current to electromagnets 10 which then strongly attacts belt 120 thereby holding the wearer of the belt tightly in his seat.

Shunt 130 diverts a small portion of the current flowing to electromagnets 10 to the relay coil 71 which closes points 73 and 74. As this happens, both hold-down coil 72 and solenoid coil 60 are activated whereby to ensure continuing and maximum flow of current to electromagnets 10. However, in order to avoid activation of the several coils longer than is necessary, the relief mechanism consisting of bimetallic strip 76 and heating coil 75 is arranged in the circuit which activates hold-down coil 72. As the latter coil is activated over a period of time, heating coil 75 gradually heats up to the point at which bimetallic strip 76 is caused to bend thereby breaking point 77 and cutting off current to hold-down coil 72. Provided deceleration has ceased, in the meantime, so that coil 71 is no longer being activated, solenoid coil 60 will also cease to operate thereby allowing weight 38 to shift to the right causing a build up of electrical resistance in carbon discs 17 thereby reducing the current flow to electromagnets 10.

The effect of closing points 73 is to cause a current to flow to the mechanism for effecting inflation of the inflatable crash pad 20 (as well as the other crash pads 18 and 19).

Referring now to FIGURE 6, the crash pad inflating mechanism is as follows. It consists essentially of a compressed gas cylinder 23 and a valve assembly generally indicated by the reference numeral 160. Cylinder 23 includes an integral diaphragm 161 for holding the gas within the cylinder wthout leakage. The gas may be air and is compressed within cylinder 23 up to a pressure of 1500 p.s.i. As the vehicle undergoes strong deceleration, the closing of points 73 of relay 16 causes a current to flow through an explosive charge 162, the ignition of which causes the small piston 163 to be driven forceably to the right as viewed in FIGURE 6 thereby driving the pin 164 through hte diaphragm 161 and permitting the gas compressed within cylinder 23 to escape through channel 165 and conduit 166 into crash pad 20.

Crash pads 18, 19 and 20 each consists of a pliable bag held in a neatly folded condition by glue applied internally. They are cemented to the dashboard of the vehicle and to the top of the back rests of the front seat of the vehicle, as previously mentioned. When the crash pads have been inflated to the predetermined permissible pressure, back pressure acting through conduit 167 and channel 168 forces the relief valve 169 outwardly against the coil spring 170 thereby allowing the excess air to escape through channel 171.

To facilitate the folding of the crash pads 18, 19 and 20, they are each provided with internal bulkheads 180 which can be folded and glued down. It will be understood, of course, that the internal gluing of the crash pads must be done with fairly weak adhesives so as to avoid any possibility that the gluing will be so effective as to resist the inflation of the crash pads by the compressed air. It will be further appreciated that once the crash pads have been inflated, they will have to be discarded and replaced by fresh folded crash pads and it will also be necessary to replace the gas cylinders 21, 22 and 23. However, it will also be appreciated that this system has been so designed that the various sequence of events which results in the inflation of the crash pads will not occur until a very strong deceleration of the vehicle is encountered. Whereas electromagnets 10 are being activated to some degree at most times, the crash pads will only be inflated when a collision is imminent or actually occurring.

FIGURE 7 illustrates one preferred construction of the magnet belt in accord with this invention. The illustrated belt is formed of nylon or leather and will, of course, be sufficiently strong to serve the ultimate purpose of the belt, that is, to hold the person wearing it against very strong inertial forces, tending to displace the person from his seat. The rearward part of the belt is provided with a plurality of iron or steel clips 190 and it is the clips which are actually attracted by the electromagnets 10. Even more desirable would be a belt covered with these clips over its full length so as to provide for the possibility that the belt might shift position about the wearer's waist so as to bring the clips 190 out of the field of the electromagnets 10. The belt could be made of attractive materials so as to be employed by men as the belt is usually worn, although it is anticipated that women might have to consider the belt as a special piece of apparatus to be put on and taken off as required. There are any number of variations on this illustrated belt which would be suitable for the purpose. Instead of the illustrated clip members 190, the belt may be wound with magnetic wire or a plurality of magnetic buttons could be riveted to the rearward portion of the belt or to the whole of the belt. A further alternative would be to employ a strong plastic envelope wrapped about the belt and containing iron filings. The only requirements that the belt must have is that it must be strong and it must be capable of attraction by electromagnets 10.

Figure 8:
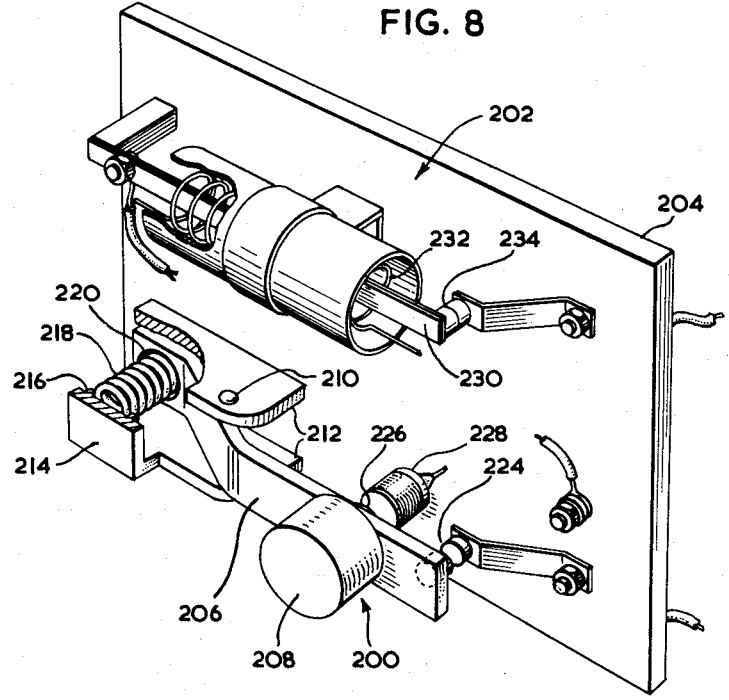
FIGURE 8 is a perspective view, partially cut-away of an inertia switch and hold down coil device in accord with a second preferred embodiment of the invention.
Figure 9:
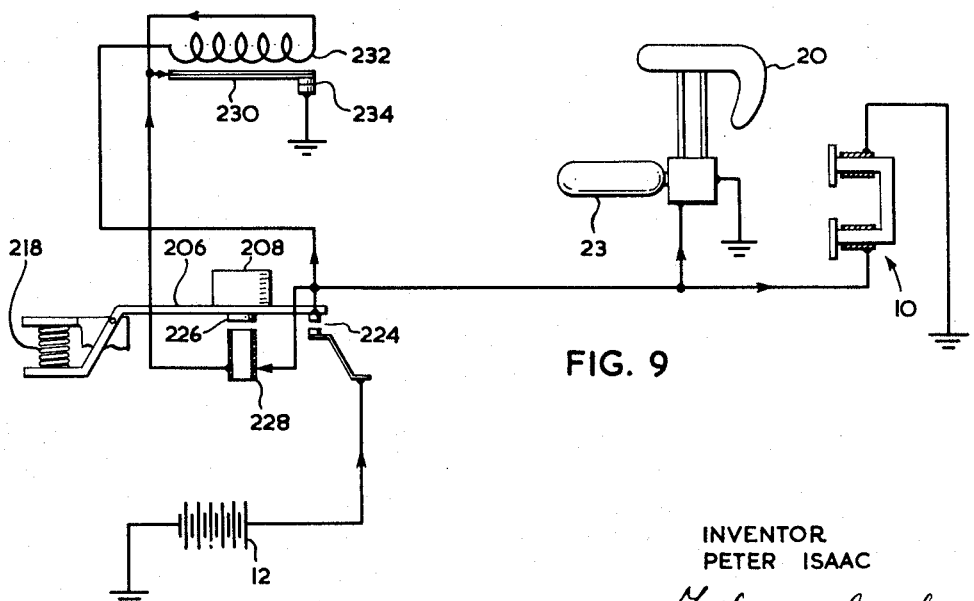
FIGURE 9 is a schematic circuit diagram similar to that shown in FIGURE 5 but incorporating the inertia switch and hold down coil device illustrated in FIGURE 8.

The above described embodiment of this invention as shown in FIGURES 1 to 7 inciusive employs an inertia rheostat device or decelerometer 14 for activating the electromagnets in the back rests of the vehicle. With the rheostat device, the activating current fed to the electromagnets varies directly with the amount of the deceleration acting on the vehicle. This is the preferred method of carrying out the present invention, since it provides the precise degree of holding power which is required at any particular time. However, the simpler form of the invention illustrated in FIGURES 8 and 9 also achieves the chief object of the invention, which is to lock the passengers in their seats at times of very high deceleration. The embodiment illustrated in FIGURES 8 and 9 is chiefly distinguished from the first embodiment in that an inertia switch is substituted for the inertia rheostat or rheostats. This inertia switch only feeds current to the electromagnets in the back rests of the seats when a predetermined value of deceleration of the vehicle is exceeded.

FIGURES 8 and 9 illustrate a preferred type of inertia switch arrangement and it will be appreciated that the arrangement shown is quite similar to that in accord with FIGURES 1 to 7, with the appropriate changes necessitated by the substitution of the inertia switch for the inertia rheostat.

The assembly shown in FIGURE 8 consists of an inertia switch device generally indicated by the reference numeral 200, and a hold down coil control device generally indicated by the reference numeral 202. These items are conveniently mounted on a base 204, which, in turn, will be fixed to the vehicle. The switch device 200 essentially consists of a pivoted lever 206 carrying a weight 208 near one end. The lever is pivotally mounted on a pin 210 extending between a pair of upstanding ears 212.

A bridge 214 connects the tops of the ears 212 and carries a well 216 which receives one end of a coil spring 218, the other end of which is received in the well 220 in the end of lever 206. Base 204 is so mounted on the vehicle that lever arm 206 runs generally transverse of the vehicle so that deceleration of the vehicle will cause weight 208 to move against the bias of spring 218. This movement of arm 206 closes the points 224, which causes a current to flow to the electromagnets incorporated in the backs of the vehicle seats in the manner explained hereinafter.

Fixed to arm 206 opposite weight 208 there is a magnetic button 226 which may constitute an extended portion of weight 208, should the latter be formed of magnetic material, such as cast iron or steel. The hold down coil 228 is fixed to base 204 opposite button 226 so that activation of coil 228 attracts the button and holds arm 206 against the bias of spring 218 whereby to maintain contact between points 224. The initial activation of hold down coil 228 occurs upon the closing of points 224 and the activation is maintained until the activating circuit is broken by the hold down coil control device 202. The latter device consists of a bimetallic strip 230, a heating coil 232, and a second pair of points 234. This control device acts in the same manner as the control device 75, 76, 77, described above. The circuit activating hold down coil 228 includes the resistance wire forming coil 232 so that the heating of this coil over a predetermined period of time will bend bimetallic strip 230 until points 234 are broken.

Referring now to FIGURE 9, the simpler circuit incorporating the inertia switch in lieu of the inertia rheostat operates as follows. Upon deceleration of the vehicle, weight 208 is shifted to close points 224, which causes the current to flow from battery 12 to both the electromagnets 19 and the firing pins which release compressed gas from cylinder 23 to inflate crash pads 20. It will be appreciated that weight 208 will only shift a sufficient distance to close pins 224 when a predetermined deceleration force is exceeded. The value of this force can be selected by the appropriate choice of spring 218.

Upon the closing of points 224, hold down coil 228 is also activated and this, in turn, acts upon button 226 to hold pins 224 closed. Likewise, the heating coil 232 is activated and when a sufficient heat has been generated to bend bimetallic arm 230, pins 234 are broken whereby to interrupt all circuits. This interrupts the activation of hold down coil 228 whereby spring 218 shifts arm 206 whereby to break points 224, provided a deceleration force of sufficient magnitude is no longer acting upon weight 208.

It will be appreciated that the embodiment of the invention illustrated in FIGURES 8 and 9, although very simple in construction, suffers the drawback that it is activated only when a certain maximum deceleration force is encountered, whereas the embodiment illustrated in FIGURES 1 to 7, in effect, is continually operative and thereby always providing the particular activating current to coils 10 as is required at any particular moment.

The second embodiment of the invention has been described as employing a single inertia switch. However, a plurality of such switches may be used in a manner similar to the use of a plurality of rheostat devices in the first embodiment. Any number of switches could be employed although the most practical would be four, one each reacting to deceleration of forward and backward movement of the vehicle, and one each reacting to sideways directed deceleration.

What I claim as my invention is:

1. A safety apparatus for a vehicle for preventing a passenger from being thrown out of his seat under the influence of inertial forces, said apparatus comprising, in combination, magnetic belt means worn by said passenger with at least a portion of said belt means being located adjacent the back rest of said seat when the passenger assumes a normal sitting position thereon, electromagnet means mounted in the back rest of said seat opposite that portion of the magnetic belt means which is located adjacent said back rest, an electric circuit for energizing said electromagnet means, and an inertia rheostat device disposed in said circuit to maintain the current supplied to said electromagnet means normally at a low value thereby permitting free movement of said passenger and to increase the current to said electromagnet means upon sudden retardation of the vehicle thereby strongly energizing said electromagnet means and restraining said passenger against movement through the magnetic attraction of said belt means by said electromagnet means.

2. A safety apparatus as claimed in claim 1, in which said electromagnet means comprises a plurality of electrically interconnected electromagnets arranged in the back rest of said seat in a horizontal plane which includes the waist portion of said passenger, said belt means being worn about the waist of said passenger.

3. A safety apparatus as claimed in claim 1, in which said inertia rheostat device includes four inertia switches disposed in said circuit one of which increases the current supply to said electromagnet means upon retardation of forward movement of the vehicle, another of which increases said current supply upon retardation of backward movement of the vehicle, the other two of which increase said current supply upon retardation of sideways movement of said vehicle.

4. A safety apparatus as claimed in claim 1, in which said inertia rheostat device comprises a plurality of carbon plate members, said plate members being arranged in face-to-face abutting series relationship, weight means mounted for free reciprocation adjacent said series of carbon plate members, spring means biasing said weight means in one direction, linkage means connecting said weight means with said series of carbon plates whereby said plates are squeezed together as said weight means moves against the bias of said spring; said series of carbon plates being arranged in said circuit as to act as a variable resistance whereby to vary the current supply to said electromagnet means as said weight means reciprocates back and forth against the bias of said spring.

5. A safety apparatus as claimed in claim 4, in which said carbon plate members are carbon discs having centrally disposed holes therethrough and contained within a cylindrical housing, said weight means consisting of an annular shaped member being reduced in diameter at one end and mounted about said housing as to reciprocate thereon, said linkage means consisting of a lever pivotally connected to said housing at one end and pivotally connected to said annular weight member at the other end and carrying a pin intermediate said ends, said pin engaging one end of said series of carbon discs as to force said discs together as said weight shifts towards the opposite end of said series of discs.

6. A safety apparatus as claimed in claim 5, in which a solenoid coil is mounted co-axially about the reduced portion of said annular weight member and in which said annular weight member is made of a magnetic material whereby said reduced portion acts as a solenoid core to shift said weight member against the bias of said coil when said solenoid coil is activated.

7. A safety apparatus as claimed in claim 6, including relay means for activating said solenoid coil, shunt means located in the circuit activating said electromagnet means, said shunt means serving to divert current to said relay means.

8. A safety apparatus as claimed in claim 7, in which said relay means includes a hold-down coil which is activated simultaneously with said solenoid coil, and delay switch means consisting of a bimetallic strip surrounded by a resistance heating coil which is activated with said hold-down coil but which deactivates said hold-down coil and solenoid coil after a predetermined time interval during which said heating coil heats up said bimetallic strip which bends sufficiently to break the circuit including said solenoid coil, said hold-down coil and said heating coil.

9. A safety apparatus as claimed in claim 1, including switch means for closing said circuit for energizing said electromagnet means, and means for automatically tripping said switch means as to close said circuit when the current to said electromagnet means is increased beyond a predetermined value by said inertia rheostat device.

10. A safety apparatus as claimed in claim 9, further including delay switch means for opening said switch means after said circuit has been closed for a predetermined time interval.

11. A safety apparatus as claimed in claim 1, in which the back rest of said seat includes coil springs, and including bracket means for mounting said electromagnet means within one of said coil springs so as to be capable of reciprocating with the forward end of the coil spring whereby the distance between said belt means which is adjacent said back rest is maintained substantially constant at all times.

12. A safety apparatus as claimed in claim 11, in which said electromagnet means is a single electromagnet which is double poled and has a U-shaped core, and further including a U-shaped bracket which is interlocked with the said U-shaped core and fixed to a frame member of said back rest.

13. A safety apparatus for a vehicle for preventing a passenger from being thrown out of his seat under the influence of inertial forces, said apparatus comprising, in combination, magnetic belt means worn by said passenger with at least a portion of said belt means being located adjacent the back rest of said seat when the passenger assumes a normal sitting position thereon, electromagnet means mounted in the back rest of said seat opposite that portion of the magnetic belt means which is located adjacent said back rest, an electric circuit for energizing said electromagnet means inertia switch means disposed in said circuit to normally maintain said circuit open thereby inactivating said electromagnet means and permitting free movement of said passenger, said inertia switch means being closed when a predetermined value of deceleration of the vehicle is exceeded, thereby energizing said electromagnet means and restraining said passages against movement through the magnetic attraction of said belt means by said electromagnet means.

14. A safety apparatus as claimed in claim 13, in which said electromagnet means comprises a plurality of electrically interconnected electromagnets arranged in the back rest of said seat in a horizontal plane which includes the waist portion of said passenger, said belt means being worn about the waist of said passenger.

15. A safety apparatus as claimed in claim 13, in which said inertia switch means comprises four inertia switches, one of which closes said circuit when said vehicle is subjected to a rearwardly directed deceleration, another of which closes said circuit when said vehicle is subjected to a forwardly directed deceleration, the other two of which close said circuit when said vehicle is subjected to sideways directed deceleration.

16. A safety apparatus as claimed in claim 13, in which said inertia switch means comprises a single inertia switch consisting of a pivoted lever arm, weight means carried adjacent one end of said lever arm, a pair of contact points, one of which is carried at one end of the lever arm, the other of which is located to contact the first when said lever arm is pivoted, said points being included within said circuit whereby the circuit is closed when said points are contacted, and spring means normally biasing said lever arm to keep said points apart, the bias of said spring means being overcome when said vehicle is subjected to a predetermined value of deceleration whereby to shift said weight thereby pivoting said lever arm.

17. A safety apparatus as claimed in claim 16, in which said circuit includes a hold down coil which is activated when said circuit is closed to hold said lever against the bias of said spring whereby to keep said points in contact and said circuit closed.

18. A safety apparatus as claimed in claim 17, further comprising a hold down coil control device included in said circuit, said control device consisting of a bimetallic strip, a first contact point carried by the bimetallic strip, a second contact point located to be contacted by the first when said bimetallic strip is unheated, resistance coil means for heating said bimetallic strip whereby to bend said bimetallic strip after said circuit has been closed for a predetermined time interval and cause said circuit to be opened.

19. A safety apparatus as claimed in claim 13, in which the back rest of said seat includes coil springs, and including bracket means for mounting said electromagnet means within one of said coil springs so as to be capable of reciprocating with the forward end of the coil spring whereby the distance between said belt means which is adjacent said back rest is maintained substantially constant at all times.

20. A safety apparatus as claimed in claim 19, in which said electromagnet means is a single electromagnet which is double poled and has a U-shaped core, and further including a U-shaped bracket which is interlocked with the said U-shaped core and fixed to a frame member of said back rest.

References Cited by the Examiner

UNITED STATES PATENTS

| 2,477,933 | 8/49 | Labser | 296—84 |
| 2,649,311 | 8/53 | Hetrick | 280—150 |
| 2,705,529 | 4/55 | Bull et al. | 280—150 |
| 2,708,966 | 5/55 | Davis | 297—386 |
| 2,825,581 | 3/58 | Knight | 280—150 |
| 2,850,291 | 9/58 | Ziccardi | 280—150 |
| 2,947,353 | 8/60 | Von Wimmersperg | 297—385 |
| 2,972,998 | 2/61 | Detwiler | 137—68 |
| 2,997,051 | 8/61 | Williams | 137—68 |

A. HARRY LEVY, Primary Examiner.

LEO FRIAGLIA, Examiner.